United States Patent [19]
Minoura et al.

[11] 4,293,184
[45] Oct. 6, 1981

[54] SCANNING PROJECTION DEVICE

[75] Inventors: Kazuo Minoura, Yokohama; Muneharu Sugiura, Tokyo; Setsuo Minami, Kawasaki; Tadashi Sato, Kokubunji, all of Japan

[73] Assignee: Canon Kabushiki Kaisha, Tokyo, Japan

[21] Appl. No.: 105,881

[22] Filed: Dec. 20, 1979

[30] Foreign Application Priority Data

Dec. 28, 1978 [JP] Japan .................................. 53-164826
May 14, 1979 [JP] Japan .................................. 54-58975

[51] Int. Cl.³ .............................................. G02B 27/17
[52] U.S. Cl. ..................................... 350/6.3; 350/6.6; 355/8; 355/52; 355/66
[58] Field of Search ..................... 350/6.1-6.91, 350/202; 355/8, 11, 66, 52, 60, 57; 354/152

[56] References Cited
U.S. PATENT DOCUMENTS 3,468,230 9/1969 Bellows .................................. 355/52
3,468,817 12/1969 Hubner ................................ 350/202
3,997,260 12/1976 Mihalik et al. ....................... 355/8
4,213,690 7/1980 Sugiura et al. ....................... 355/52

*Primary Examiner*—Jon W. Henry
*Attorney, Agent, or Firm*—Fitzpatrick, Cella, Harper & Scinto

[57] ABSTRACT

A scanning projection device in which a first plane is scanned by a light deflector provided between the first plane and a second plane and partial surfaces of the first plane scanned by the deflector are successively projected at a predetermined position on the second plane. A projection optical system is disposed between the deflector and the second plane and in the plane of deflection in which the light beam from the first plane is deflected by the deflector, the projection optical system is swung and tilted in synchronism with the deflecting action of the deflector, and the deflector and the projection optical system are moved while varying their relative distance in synchronism with the deflecting action of the deflector.

6 Claims, 20 Drawing Figures

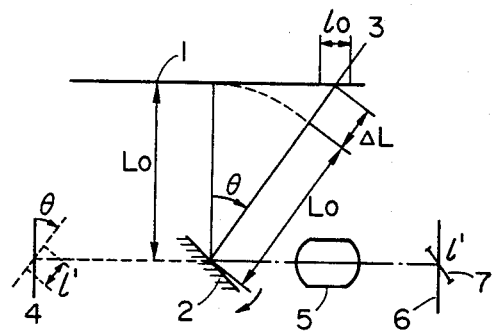
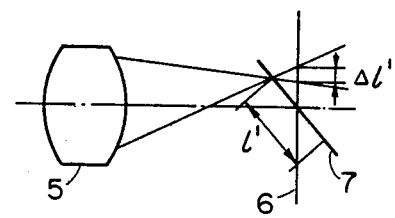
FIG. 1
PRIOR ART
FIG. 2
PRIOR ART
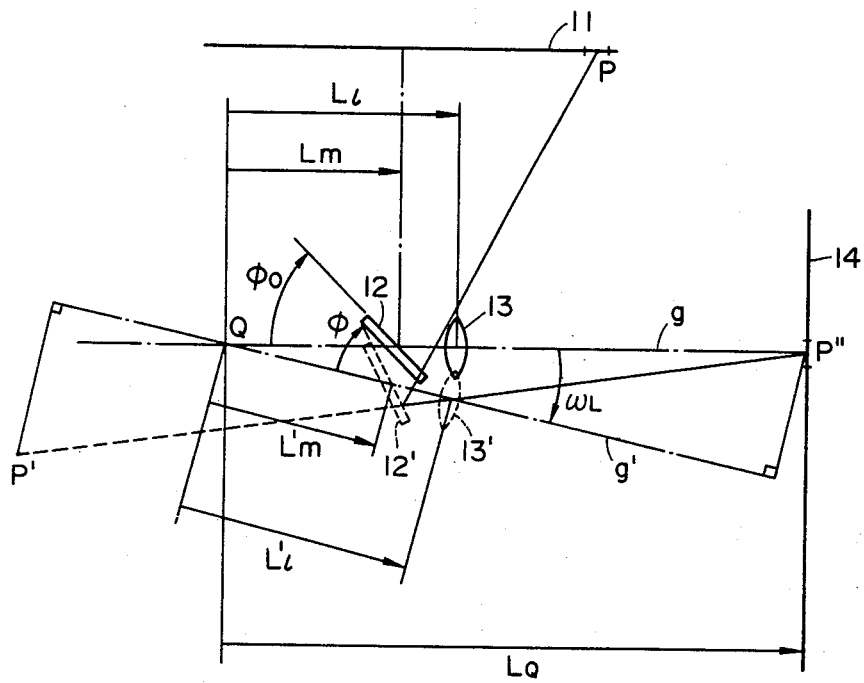
FIG. 3

SCANNING PROJECTION DEVICE

BACKGROUND OF THE INVENTION

1. Field of the Invention

This invention relates to a slit scanning projection device for slit-scanning the information of a flat scanned surface by the use of a deflector and projecting the information on a light receiving surface.

2. Description of the Prior Art

It is well-known that an optical device which scans a flat scanned surface in a slit formed by the use of a deflector such as a rotatable or pivotable mirror and projects the information of the scanned surface upon a light receiving surface is a projection device which can transmit the information of the scanned surface onto the light receiving surface at high speed and which is highly effective in vibration and mechanism. FIG. 1 of the accompanying drawings is a schematic view showing an embodiment of the conventional scanning projection device using a rotatable mirror as the deflector. A flat scanned surface 1 is determined by a slit, not shown, by the use of a rotatable mirror 2. The flat scanned surface is scanned as a slit-like scanned surface 3 having a width $l_0$ and this slit-like scanned surface 3 is imaged on a light receiving surface 6 by a projection optical system 5. However, when the flat scanned surface is scanned by the use of the rotatable scanning mirror 2, the difficulty is encountered that the length of the light path between the scanned surface 1 and the light receiving surfacce 6 is varied with the rotation of the rotatable scanning mirror 2. That is, if the position of the rotatable scanning mirror when the distance between the rotatable scanning mirror 2 and the scanned surface is shortest ($L_O$) is defined as the standard position and the distance between the scanning mirror 2 and the scanned surface 1 when the scanning mirror has been rotated by $\theta°$ from the standard position is $L_O + \Delta L$, then the following expression can be obtained:

$$L = (1/\cos\theta - 1)L_O$$

This $\Delta L$ is the amount of discrepancy of the length of light path created by the rotation of the scanning mirror and in the usually conceivable form of use wherein $|\theta| \leq 25°$ and $L_O = 400$ mm, $\Delta L$ amounts to a maximum 41.4 mm.

As the means for correcting such variation in the length of light path, Japanese Patent Publication No. 9182/1975 discloses providing parallel-movable mirrors before and behind a projection optical system leading from the rotatable mirror to the image plane to correct the variation in the length of light path and moving the projection optical system to eliminate the fluctuation of the conjugate arrangement. Also, U.S. Pat. No. 3,537,373 discloses causing two lens elements within the projection optical system to act synchronously in parallelism to the optic axis to thereby eliminate any variation in the length of light path and any fluctuation of the conjugate arrangement.

However, where a rotatable mirror is used in a copying apparatus, there is another difficulty in addition to the variation in the length of light path. It is that, as viewed from the light receiving surface 6 side, the scanned surface 1 falls down in accordance with the angle of rotation of the rotatable mirror 2. That is, when the mirror image 4 of the slit-like scanned surface 3 by the rotatable mirror 2 is considered, the mirror image 4 is inclined by the angle of rotation $\theta$ of the mirror 2 with respect to the optic axis of the projection optical system 5. (This condition will hereinafter be referred to as the swing and tilting). The image 7 of this slit-like scanned surface 3 formed on the light receiving surface 6 by the projection optical system 5 is also swung and tilted by $\theta$. When the device is used under the conditions that the slit width $l_O$ is 10 mm and the F-number of the projection optical system is 10, the out-of-focus width $\Delta l'$ of the slit image 7 on a photosensitive medium 6 will be as great as about 0.2 mm, as shown in FIG. 2 of the accompanying drawings, if $\theta = 25°$, and such out-of focus width is not allowable in practice.

SUMMARY OF THE INVENTION

It is an object of the present invention to provide a scanning projection device of the described type but having an optical system for correcting the length of light path with the image formation magnification maintained constant and for correcting the fall-down of the image projected upon the light receiving surface.

It is a further object of the present invention to provide a scanning projection device of the described type but having an optical system for correcting the length of light path with the image formation magnification maintained constant and for correcting the fall-down of the image projected upon the light receiving surface, said optical system having a magnification changing function capable of selecting the image formation magnification to a desired value.

It is still a further object of the present invention to provide a projection device which can well maintained the image formation magnification and the length of light path by a simple construction.

To achieve these objects, in the scanning projection device according to the present invention, a deflector is provided a first plane and a second plane so that the images of the first plane scanned by the deflector are successively projected at a predetermined position on the second plane with lapse of time, and a projection optical system provided between the deflector and the second plane is swung and tilted in the plane of deflection of the light beam from the first plane scanned deflected by the deflector, in synchronism with the deflecting action of the deflector, while, at the same time, the deflector and the projection lens system are moved in the direction of the optic axis of the projection optical system in synchronism with the deflecting action of the deflector. Here, the phenomenon of swinging and tilting the projection optical system refers to the phenomenon that the angle formed by the optic axis of the projection optical system with respect to the second plane is varied with lapse of time, and the term used herein "swinging and tilting the projection optical system" is intended to mean such phenomenon.

Describing the principle of the scanning projection device according to the present invention, a predetermined relation is not particularly established between the angle of deflection of the beam deflected by the deflector and the angle of swing and tilting of the projection optical system, but when the image formation magnification (lateral magnification) of the projection optical system for projecting the first plane upon the second plane is one-to-one magnification, the angle of swing and tilting can be made equal to ½ of the angle of deflection of the beam. However, if it is assumed that the deflected beam is the beam deflected when a spatially fixed beam is deflected by the deflector, the angle of deflection of said beam means the angle formed by said deflected beam with respect to a standard one of the deflected beams. If, in this case, a galvano mirror such as a mechanical deflector or a rotatable polygon mirror is used as the deflector, the angle of rotation of the deflector will become equal to the angle of swing and tilting of the projection optical system.

In the scanning projection device according to the present invention, if use is made of a galvano mirror or a rotatable polygon mirror having a reflecting mirror on the deflecting surface thereof, the center of rotation of the deflecting surface of the deflector may or may not be coincident with the center of swing and tilting of the projection optical system. However, where the angle of rotation of the deflector is equal to the angle of swing and tilting of the projection optical system, as described above, the center of rotation of the deflecting surface may preferably be made coincident with the center of swing and tilting of the projection optical system to simplify the device.

Further, in the scanning projection device according to the present invention, optical means for varying the image formation magnification is provided between the projection optical system and the second plane. This optical means comprises a variable magnification optical system retractably and insertably provided on the light path between the projection optical system and the second plane, and a light path length correcting optical system for correcting any variation in the length of light path caused by the retraction and insertion of the variable magnification optical system and for ensuring the light beam to be imaged on the second plane. This light path length correcting optical system is always disposed in the light path between the projection optical system and the second plane and may be installed so as to perform its function with the retraction or insertion of the variable magnification optical system or may be inserted so as to be retracted from or inserted into the light path during magnification change as is the variable magnification optical system.

The scanning projection device according to the present invention is of course usable in a projection system of the reverse type wherein information is provided at a predetermined position on the second plane and the information is projected upon the first plane. For example, the projection optical system of the type in which the information of the first plane is projected upon the second plane is applicable to a copying apparatus, and the projection optical system of the aforementioned reverse type is applicable to a photographic typesetting apparatus or the like.

The invention will become more fully apparent from the following detailed description thereof taken in conjunction with the accompanying drawings.

BRIEF DESCRIPTION OF THE DRAWINGS

FIGS. 1 and 2 illustrate the scanning projection device according to the prior art.

FIGS. 3 and 4 illustrate the principle of the scanning projection device according to the present invention.

DESCRIPTION OF THE PREFERRED EMBODIMENTS

Figure 4:
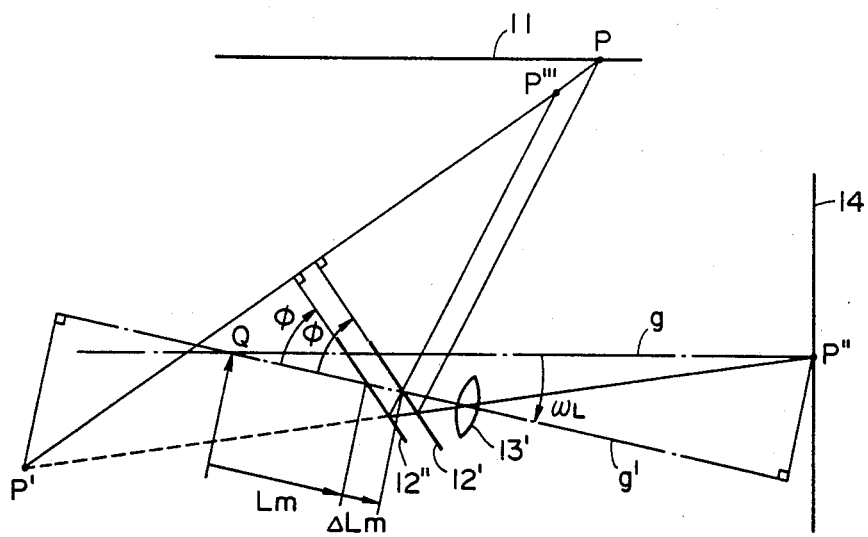

FIG. 3 is a schematic view showing an embodiment of the scanning device according to the present invention to illustrate the principle of the invention.

In the scanning projection device shown in FIG. 3, reference numeral 11 designates a flat object corresponding to the aforementioned first plane, reference numeral 12 denotes a pivotable mirror corresponding to the aforementioned deflector, reference numeral 13 designates a projection lens, reference numeral 14 designates a photosensitive medium surface corresponding to the aforementioned second plane, reference character Q denotes the center of pivotal movement of the mirror 12 and projection lens 13, and reference numerals 12' and 13' respectively designate the mirror and projection lens pivotally moved about the point Q. The center of pivotal movement Q lies on the optic axis of the projection lens 13 or 13'.

The standard positions of pivotal movement of the mirror and projection lens are determined as follows:

Let $\phi_0$ be the angle formed between the optic axis of the projection lens 13 and the reflecting surface of the mirror 12, Ll be the distance from the center of pivotal movement Q to the projection lens 13, and Lm be the distance from the center of pivotal movement Q to the intersection between the reflecting surface of the mirror 12 and the optic axis g of the projection lens 13. This pivotally moved condition is determined as the standard of pivotal movement.

With this condition as the standard, the mirror and projection lens are pivotally moved to the positions 12' and 13', respectively, and let $\omega L$ be the angle of rotation of the optic axis g' of the projection lens 13', $\phi$ be the angle formed by the reflecting surface of the mirror 12' with the optic axis g, L'l be the distance from the center of pivotal movement Q to the projection lens 13', and L'm be the distance from the center of pivotal movement Q to the intersection between the reflecting surface of the mirror 12' and the optic axis g' of the projection lens.

By the pivotal movement of the mirror 12 and projection lens 13', the object surface 11 is slit-scanned so as to satisfy the relation that a slit-like object containing the point P on the object surface 11 and perpendicular to the plane of the drawing sheet is imaged in the form of a predetermined slit containing the predetermined point P'' on the photosensitive medium surface by the mirror 12' and the projection lens 13'.

First, as the condition for causing the object on the object surface to be imaged parallel to the photosensitive medium surface 14, the reflecting surface of the mirror 12' forms with the optic axis g' of the projection lens an angle expressed by the following equation:

$$\phi = \frac{1}{2}\{\tan^{-1}(-\tan W_L/\beta) - W_L\} + \phi_O \quad (1)$$

where $\beta$ represents the image formation magnification.

Next, as the condition on which the point P'' lies in the image forming plane of the projection lens 13', the position of the projection lens is at a distance expressed by the following equation from the center of pivotal movement Q:

$$L'l = L_Q \cos W_L - (1-\beta)f - \Delta \qquad (2)$$

where $L_Q$ represents the distance from the center of pivotal movement to the point P'', f represents the focal length of the projection lens, and $\Delta$ represents the distance between the principal points of the lens.

Finally, as the condition on which the point P conjugate with the point P'' on the photosensitive medium surface should lie on the object surface, the point P is moved parallel to the optic axis of the projection lens 13' by $\Delta$ Lm in the manner to be described hereinafter. As shown in FIG. 4, a point P' is a point conjugate with the point P'' on the photosensitive medium surface and 12'' is an imaginary reflecting surface when it is assumed that the distance Lm on the optic axis of the projection lens from the projection lens to the reflecting surface is not varied. The mirror image of the point P' by this imaginary reflecting surface is usually a point P''' which does not lie on the object surface.

The straight line passing through this point P''' and the point P' is orthogonal with the imaginary reflecting surface 12''. Assuming that the intersection between the straight line passing through the points P''' and P' and the object surface is P and that the plane 12 passing through the mid-point of $\overline{PP'}$ and orthogonal to $\overline{PP'}$ is the actual reflecting surface, the point P on the object surface can be imaged on the photosensitive medium surface 14. At this time, the reflecting surface 12' may be displaced parallel to the optic axis of the projection lens by $\Delta$ Lm from the position of the imaginary reflecting surface 12''. The $\Delta$ Lm is obtained as follows:

$$\Delta Lm = (\overline{P''P} - \overline{PP})/2 \sin \phi \qquad (3)$$

By satisfying the foregoing three conditions (1) to (3), the slit-like object on the object surface can be imaged on the photosensitive medium surface without movement of the focus.

If, in equation (1), the image formation magnification $\beta$ is $\beta = -1$ and is one-to-one magnification, $\phi = \phi_O$ and the predetermined angle $\phi$ is always maintained with respect to the optic axis of the projection lens.

Equation (1) is also the condition for completely eliminating the so-called swing and tilting of the slit image on the object surface by being satisfied simultaneously with equations (2) and (3), but in practice, if the amount of swing and tilting is within the depth of focus, it is of course unnecessary to dare vary the angle of the reflecting surface with respect to the optic axis of the projection lens.

That is, even when $\beta \neq -1$, there is case that $\phi = \phi_O$, namely, a case that with the angle of inclination of reflecting surface with respect to the optic axis of the projection lens being the predetermined value $\phi_O$, the reflecting surface and the projection lens are pivotally moved so that the slit image on the object surface comes into the depth of focus.

Figure 5:
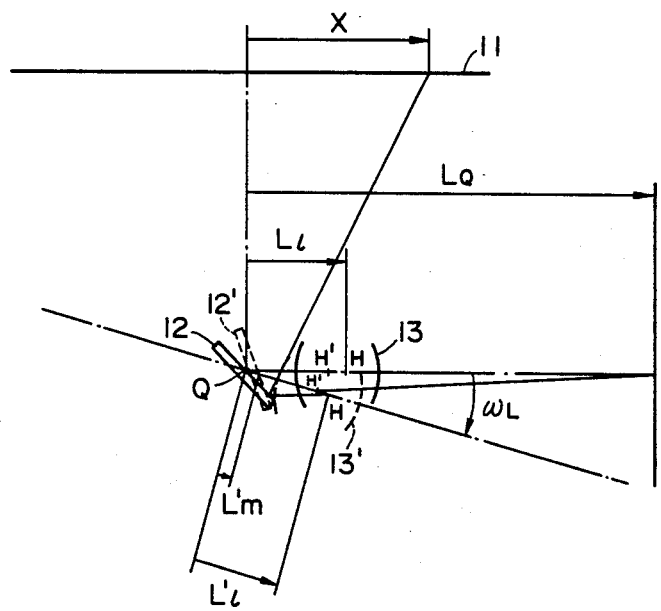
FIGS. 5 to 10 illustrate an embodiment of the scanning projection device according to the present invention.
Figure 6:
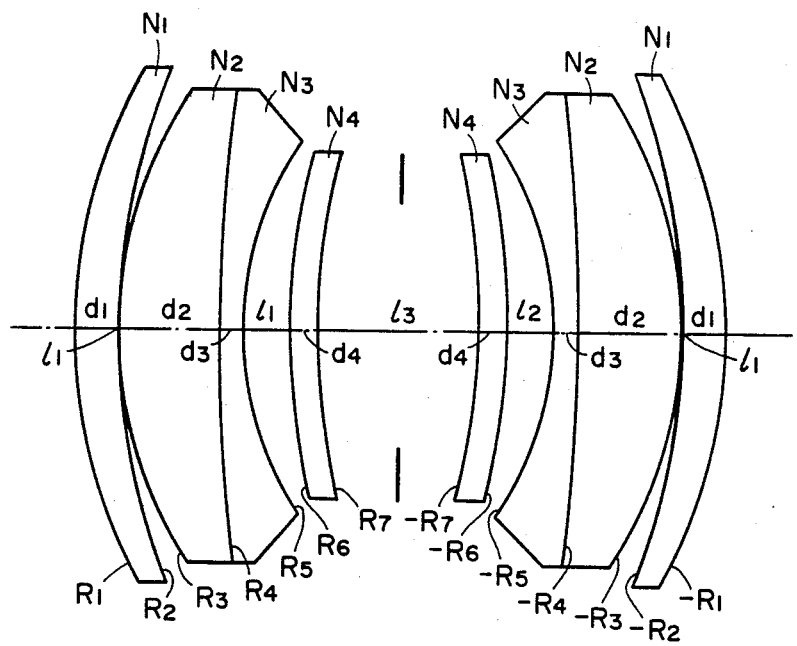

An embodiment of the scanning projection device according to the present invention will now be described. In FIG. 5 which shows an embodiment of the present invention, the center of pivotal movement Q is installed so as to satisfy the following numerical data in the standard condition:

$\phi_O = -45°$
$Lm = 0$.
$Ll = 154.05$
$L_Q = 750$.

where Ll is the distance from the center of pivotal movement to the object side principal point of the projection lens. The focal length f of the projection lens, the distance $\Delta$ between the principal points and the lens data are of the following values and the then configuration of the lens is shown in FIG. 6.

| f = 302.16 | | |
|---|---|---|
| $\Delta$ = −8.36 | | |
| $R_1$ = 111.06 | $d_1$ = 9.53 | $N_1$ = 1.6935 |
| $R_2$ = 131.0 | $l_1$ = 0.33 | |
| $R_3$ = 90.714 | $d_2$ = 23.0 | $N_2$ = 1.6935 |
| $R_4$ = 524.22 | $d_3$ = 5.01 | $N_3$ = 1.61293 |
| $R_5$ = 65.395 | $l_2$ = 9.08 | |
| $R_6$ = 128.76 | $d_4$ = 7.06 | $N_4$ = 1.80610 |
| $R_7$ = 178.1 | $l_3$ = 34.4 | |

In the above, Ri represents the radius of curvature di represents the axial thickness, li represents the axial air space, and Ni represents the refractive index.

The image formation magnification $\beta$ of this system is $\beta = -1$. In this case, the angle formed between the reflecting surface of the mirror 12 and the optic axis of the projection lens 13 is always 45° irrespective of their pivotal movement. Accordingly, $\phi_O = \phi = 45°$.

Figure 7:
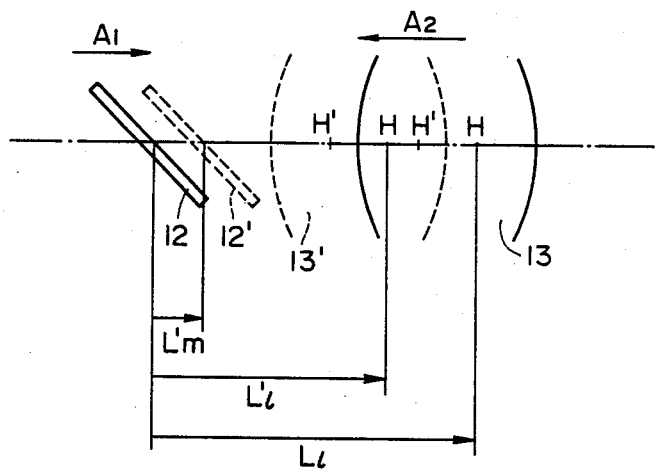
Figure 8:
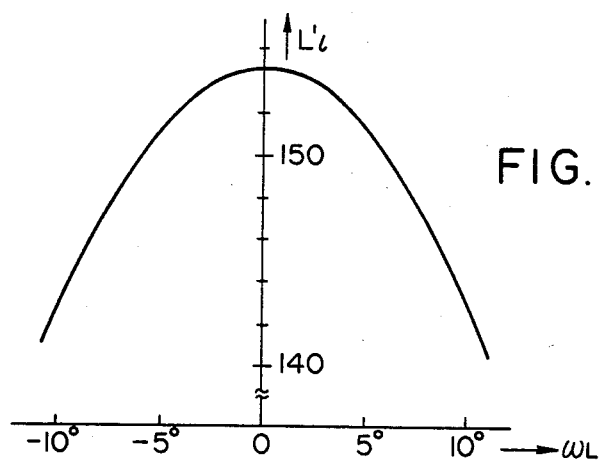
Figure 9:
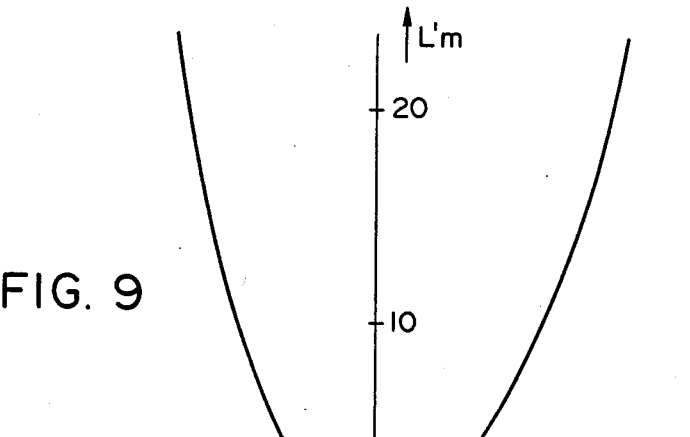

The then positional relation between the mirror 12 and the projection lens 13 is shown in FIG. 7. With the deflecting action of the deflector, the mirror 12 is moved on the optic axis of the projection lens toward the photosensitive medium surface 14 as indicated by arrow $A_1$ while, on the other hand, the projection lens is moved on the optic axis thereof toward the scanned surface 11 as indicated by arrow $A_2$. In FIG. 7, H and H' designates the object side principal point and the image plane side principal point, respectively, of the projection lens. FIG. 8 shows the relation between the distance between the projection lens 13 and the center of pivotal movement Q and the angle of swing and tilting of the projection lens. In FIG. 8, the vertical axis represents the distance L'l from the center of pivotal movement Q to the object side principal point of the projection lens 13', and the horizontal axis represents the inclination $W_L$ of the optic axis of the projection lens. FIG. 9 shows at what distance from the center of pivotal movement Q the mirror 12 is positioned with the deflecting action thereof. In FIG. 9, the vertical axis represents the distance L'm from the center of pivotal movement Q to the mirror and the horizontal axis represents the inclination $W_L$ of the optic axis of the projection lens system.

Figure 10:
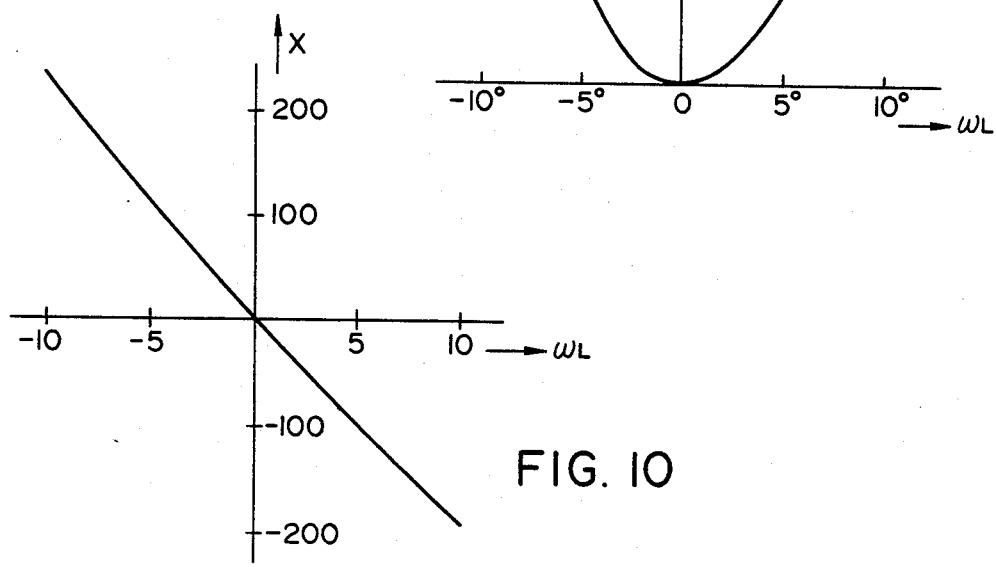

Further, on the assumption that the scanning position on the object surface is at a distance X with the scanning position in the standard condition of pivotal movement as the standard, X is varied with respect to the inclination $W_L$ of the optic axis as shown in FIG. 10.

Figure 11:
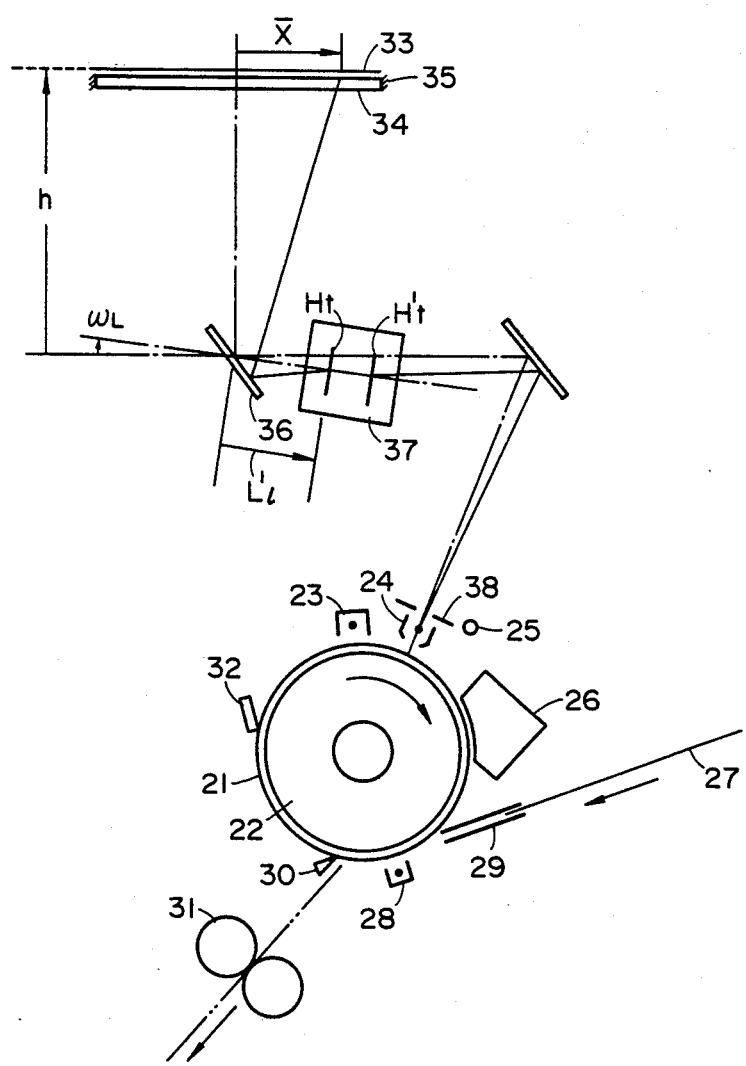
FIGS. 11 and 12 show embodiments of the apparatus to which the scanning projection device according to the present invention is applied.

FIG. 11 schematically shows an embodiment of the copying apparatus to which the scanning projection device of the present invention is applied. In the apparatus shown in FIG. 11, the center of rotation of the projection lens system 37 is made coincident with the center of rotation when the pivotable mirror 36 lies at the standard position of pivotal movement. In FIG. 22, a drum 22 having on its peripheral surface a photosensitive medium 21 comprising a lamination of an electrically conductive substrate, a photoconductive layer and a transparent insulating surface layer is supported in place within the apparatus and rotated at a constant velocity in the direction of arrow by an electric motor, not shown. The rotational velocity of the drum 22 is equal for any copying magnification. The surface of the photosensitive medium 21 is first uniformly charged by a DC corona discharger 23.

Next, the photosensitive medium 21 is slit-exposed to the light image of an original to be copied and simultaneously therewith, is subjected to AC corona discharge or the corona discharge from a DC corona discharger 24 opposite in polarity to the discharger 23.

The discharger 24 is provided with a slit opening through which the image forming light beam may pass. Then, the whole surface of the photosensitive medium is uniformly illuminated by a lamp 25, whereby an electrostatic latent image of high contrast corresponding to the image of the original is formed on the photosensitive medium. This latent image is developed into a visible toner image by a developing device 26 of the magnet brush type or like type supplying toner to the photosensitive medium 21. The resultant visible toner image is transferred to transfer paper 27 transported at the same velocity as the peripheral velocity of the drum 22 while having the back side thereof subjected to discharge from a corona discharger 28 opposite in polarity to the charge of the toner enhance the image transfer efficiency. Sheets of transfer paper are taken out one by one from a cassette, not shown, in synchronism with the rotation of the drum, and the transfer paper so taken out is brought into contact with the photosensitive medium 21 through a guide 29, whereafter the transfer paper is separated from the photosensitive medium by a pawl 30. The transfer paper conveyor mechanism is known. The toner image carried on the transfer paper is fixed by a fixing device of the heating roller type or like type. On the other hand, after completion of the image transfer, any toner remaining on the surface of the photosensitive medium 21 is removed by a cleaning device 32 such as a rubber blade or the like urged against the photosensitive medium, and the cleaned photosensitive medium 21 becomes ready for another cycle of the image formation process.

The original 33 to be copied rests on a transparent flat original supporting table 34. The original supporting table 33 is immovably fixed to immovable members 35 such as the side plates of the copying apparatus body.

The original 33 is subjected to the flying image scanning, with the pivotal movement of the pivotable mirror 36, by the image of the slit 38 formed by the projection lens system 37.

Figure 12:
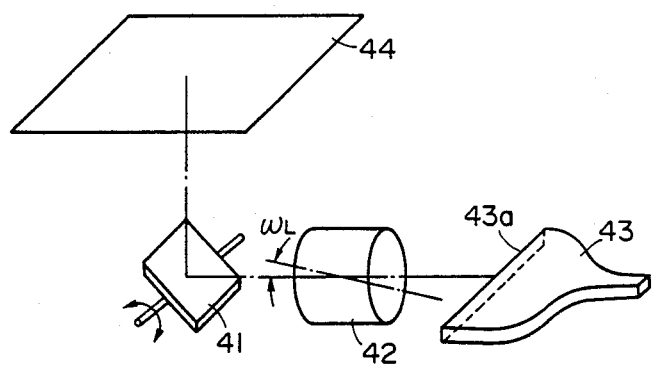

FIG. 12 shows another embodiment to which the scanning device of the present invention is applied and the difference of this embodiment from the above-described embodiment is that the direction in which projection is effected is opposite. In FIG. 12, a deflector 41 and a projection lens system 42 perform the same operation as that in the above-described projection system. Reference numeral 43 designates a CRT or a circle line converter and projection is effected on the surface 43a thereof. Information is applied onto the surface 43a with lapse of time and this information is projected onto a writing plane by the pivotal movement of the deflector 41. Means equivalent to means for displaying the information on the surface 43a may be easily constructed by the use of other optical means.

Figure 13:
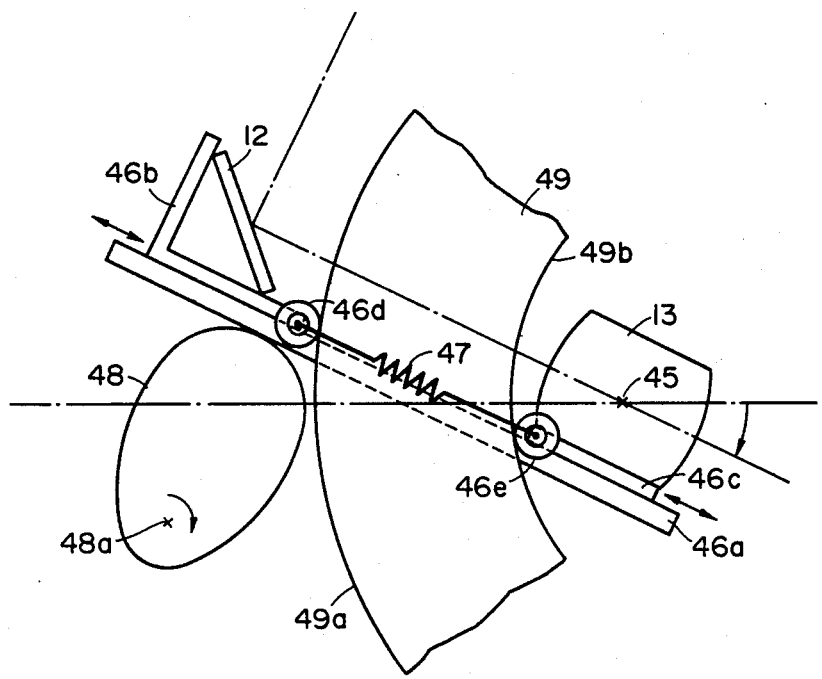
FIG. 13 schematically shows an embodiment of the driving mechanism for the scanning projection device according to the present invention.

FIG. 13 schematically shows an embodiment of the driving mechanism for the device of the present invention as shown in FIG. 3. On a unit table 46a pivotable about the center of pivotal movement 45 of the unit, there are provided two movable beds 46a and 46c movable on the unit table 46a and these movable beds are connected together by a spring 47. A deflecting mirror 12 and a projection lens 13 are fixedly disposed on the movable bed 46b and the movable bed 46c, respectively. The unit table 46a is placed on a rotatable cam 48 rotatable about the center of rotation 48a thereof and accordingly, when this cam 48 is rotated, the unit table effects swing and tilting movement about the center of pivotal movement of the unit in accordance with the configuration of the outer periphery of the cam. The movable bed 46b has a rotatable disc 46d secured thereto and the movable bed 46c is also provided with a disc 46e. These discs are urged against the peripheral surfaces 49a and 49b, respectively, of a fixed cam 49 by the aforementioned spring. The configuration the peripheral surfaces 49a and 49b of this fixed cam is such that the mirror 12 and the projection lens 13 are maintained at a predetermined interval in accordance with the angle at which the unit table 46a is swung and tilted. Accordingly, if the cam 48 is rotated by drive means, not shown, the pivotal movement of the mirror 12 and the swing and tilting of the projection lens 13 take place and at the same time, the interval between the mirror 12 and the projection lens 13 is maintained at a predetermined value.

In the foregoing, the basic principle and embodiments when the system has no magnification changing function have been described and now, description will be made of the principle of magnification change which is a further object of the present invention.

Figure 14:
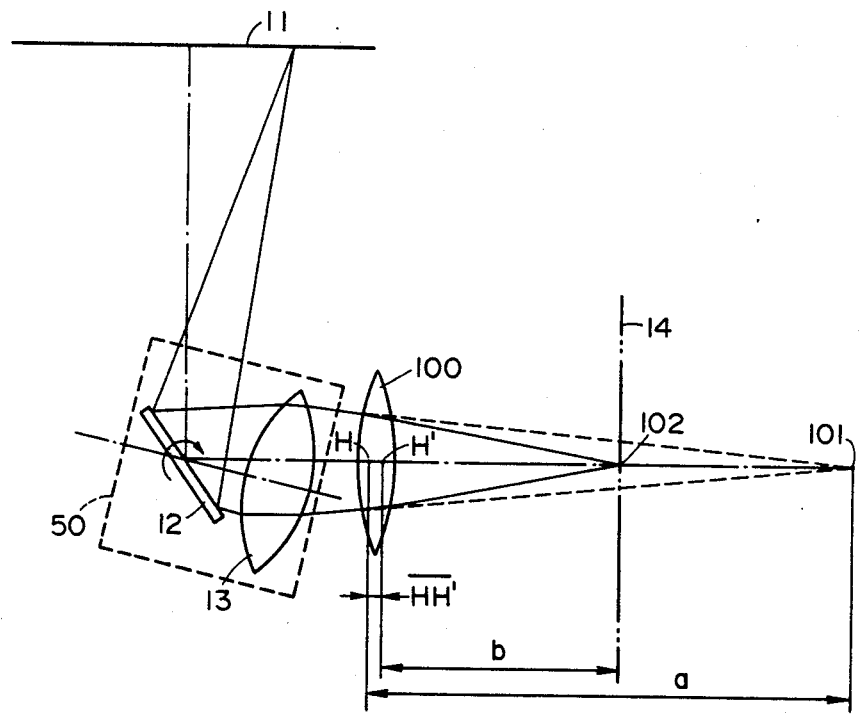
FIG. 14 illustrates the principle of the magnification change in the device according to the present invention.

FIG. 14 shows an arrangement in which a magnification changing lens 100 is provided between a housing 50 containing therein the deflecting mirror 12 and the projection lens 13 and a light receiving surface 14. The image point 101 of the projection lens 13 is the object point of the magnification changing lens 100. The position of this object point is not spatially displaced by the scanning as already described, but is always fixed and therefore, the conjugate image thereof by the magnification changing lens 100 is neither spatially displaced but is always formed at a fixed position 102 on the light receiving surface 14.

When the image formation magnification of the system as shown in FIG. 11 which has no magnification changing function is one-to-one magnification and when it is assumed in FIG. 14 that the distance from the object side principal point H of the magnification changing lens 100 to the image point 101 of the projection lens 43 is $a$, that the distance from the image side principal point H' of the magnification changing lens 100 to the light receiving surface 14 is $b$ and that the interval between the principal points of the magnification changing lens 100 is $\overline{HH'}$, then a slit image at a predetermined magnification $-a/b$ is formed always on a fixed position without swing and tilting.

As described above, when magnification change is effected, there occurs a light path difference of $(a-b+\overline{HH'})$ with respect to the entire length of the light path when no magnification change is effected and therefore, in the actual device, the above-mentioned light path difference is corrected by the use of two movable mirrors as shown in FIGS. 15A-15D and magnification change can be accomplished without the necessity of moving the original surface 11 and the light receiving surface 14.

Figure 15A:
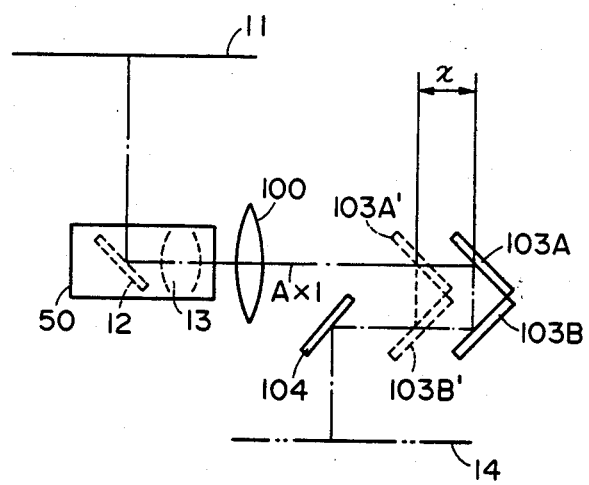
FIGS. 15(a), (b), (c) and (d) and FIG. 16 show optical means for correcting the length of light path in the device according to the present invention.

FIG. 15A shows a case where incident light rays and reflected light rays are made parallel to each other by the use of a roof-shaped mirror having a mirror surface angle of 90° and disposed between the magnification changing lens 100 and the light receiving surface 14. In contrast with the positions of the mirrors 103A and 103B when the magnification changing lens 100 is not used, the mirrors 103A' and 103B' when magnification change is effected by the use of the magnification changing lens 100 are moved by x along the direction of the optic axis AX1 of the magnification changing lens 100. In this case, $$x = -(a - b + \overline{HH'})/2$$

Figure 15B:
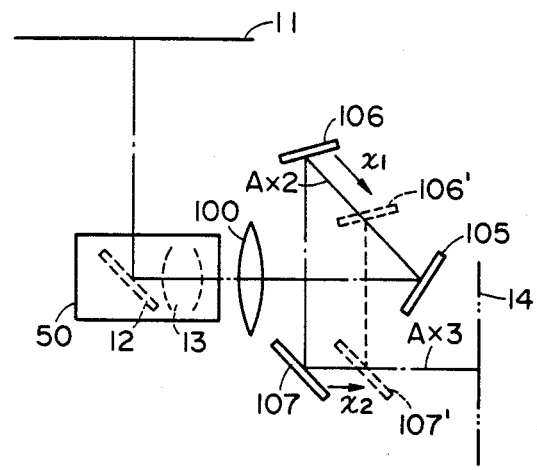
Figure 16:
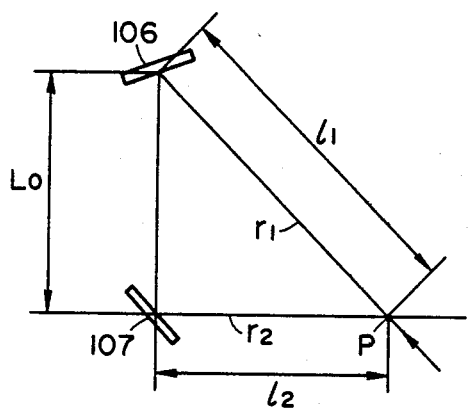

FIG. 15B shows a case where a mirror 106 and a mirror 107 are moved by $x_1$ and $x_2$, respectively, along the optic axis AX2 and the optic axis AX3, respectively, while maintaining constant the angle formed by mirror surfaces (106, 107). In this case, $x_1$ of the mirror 106 and $x_2$ of the mirror 107 are determined in accordance with the following equations:

$$x_1 = \frac{-l_1}{l_1 + l_2 + L_o}(a - b + \overline{HH'})$$
$$x_2 = \frac{-l_2}{l_1 + l_2 + L_o}(a - b + \overline{HH'})$$

where, as shown in FIG. 16, $l_1$ represents the distance between the intersection P between a light ray $r_1$ incident on the mirror 106 and a light ray $r_2$ reflected by the mirror 107 and the reflection point of the mirror 106, $l_2$ represents the distance between said intersection P and the reflection point of the mirror 107, and $L_o$ represents the distance between the reflection points of the mirrors 106 and 107.

Figure 15C:
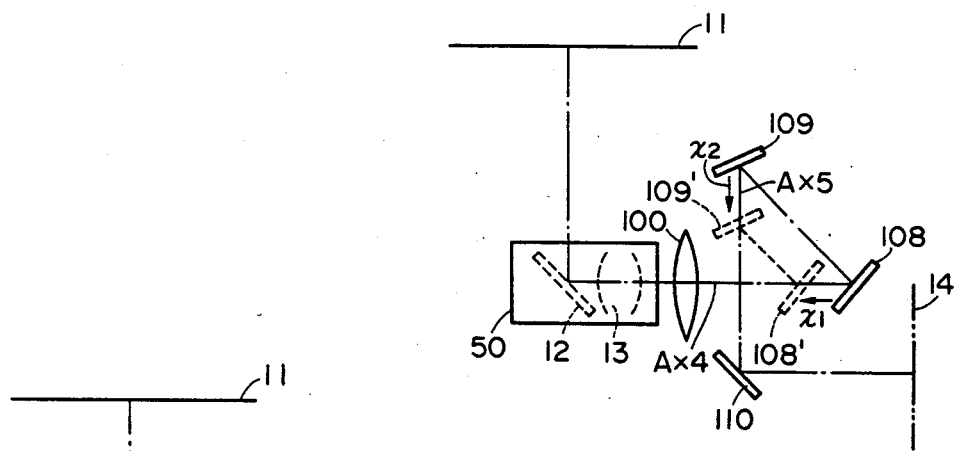

FIG. 15C shows a modification of the arrangement shown in FIG. 15B. When the magnification changing lens 100 is inserted, a mirror 108 and a mirror 109 are moved to positions 108' and 109' by $x_1$ and $x_2$, respectively, along the directions of the optic axis AX4 and the optic axis AX5, respectively, on the basis of the above-described relation. In FIGS. 15B and 15C, mirrors 105 and 110 are fixed mirrors which are not moved even during magnification change.

Figure 15D:
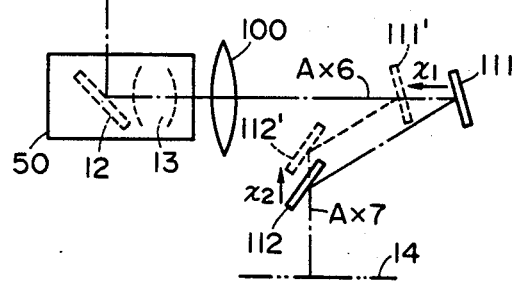

FIG. 15D shows a further modification. When the magnification changing lens 100 is inserted, a mirror 111 and a mirror 112 are moved by $x_1$ and $x_2$, respectively, along the directions of the optic axis AX6 and the optic axis AX7, respectively, on the basis of the above-described relation.

Figure 17:
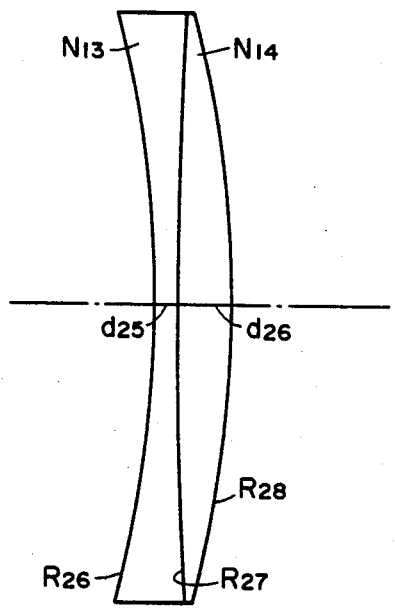
FIG. 17 shows an embodiment of the magnification changing lens applied to the device according to the present invention.

FIG. 17 shows an embodiment of the magnification changing lens used in the above-described magnification changing system. In succession from the aforementioned projection lens side, curvature radii are $R_{26}$, $R_{27}$, $R_{28}$, axial intersurface distances are $d_{25}$, $d_{26}$, and refractive indices of the glass are $N_{13}$, $N_{14}$.

| | | |
|---|---|---|
| $R_{26} = -368.5$ | $d_{25} = 7.5$ | $N_{13} = 1.59551$ |
| $R_{27} = -2862.6$ | $d_{26} = 14.9$ | $N_{14} = 1.69680$ |
| $R_{28} = -316.9$ | | |

The image formation magnification of about $-0.65$ times can be obtained by disposing the above-described magnification changing lens in that side of the projection lens which is adjacent to the light receiving surface. This image formation magnification is not varied by scanning as already described with reference to FIG. 14, and a slit image without swing and tilting is formed always at a predetermined position on the light receiving surface. In such a magnification changing system, the center of pivotal movement of the aforementioned housing 50 should preferably be set at a point as near as possible to the position of the exit pupil of the projection lens.

In the scanning projection device according to the present invention, as described above, the information of the first plane is projected upon the second plane through deflector means without swing and tilting and with the length of the light path being corrected, and the device has an excellent effect that magnification change can also be accomplished by a simple construction.

What we claim is:

1. A scanning projection device comprising:
    a fixed first plane having a surface to be scanned;
    a second plane upon which the image of said first plane is projected;
    a deflector disposed between said first plane and said second plane to project the image of said first plane at a predetermined position on said second plane with lapse of time;
    a projection optical system disposed between said deflector and said second plane to place said first plane and said second plane in an optically conjugate positional relation;
    means for swinging and tilting said projection optical system in synchronism with the deflecting action of said deflector, wherein the center of swing and tilting of said projection optical system lies on the deflecting-reflecting surface of said deflector; and
    means for varying the distance between said deflector and said projection optical system in synchronism with the deflecting action of said deflector.

2. The scanning projection device according to claim 1, wherein said deflector is a galvano mirror and the center of swing and tilting of said projection optical system is coincident with the center of pivotal movement of said galvano mirror.

3. The scanning projection device according to claim 1, wherein ½ of the deflection angle of a beam deflected by the deflecting action of said deflector is equal to the angle of swing and tilting of said projection optical system.

4. A scanning projection device comprising:
    a first plane having the surface thereof scanned;
    a second plane provided at a position optically conjugate with said first plane; and
    a projection optical device disposed between said first plane and said second plane to render said scanned plane and the plane of projection into an optically conjugate position;
    said projection optical device having light beam reflecting means, a projection optical system disposed between said light beam reflecting means and said second plane, means for swinging and tilting said light beam reflecting means and said projection optical system integrally, and means for varying the distance between said light beam reflecting means and said projection optical system in synchronism with the swinging and tilting action of said swinging and tilting means.

5. A copying apparatus including a scanning projection device comprising:
- a flat original supporting table to be scanned;
- a photosensitive medium provided at a position optically conjugate with an original on said supporting table;
- a projection optical device disposed between said supporting table and said photosensitive medium to place said original and said photosensitive medium into an optically conjugate position;
- means for limiting the light from said original to said photosensitive medium to slit-like form;
- said projection optical device having light beam reflecting means, a projection optical system disposed between said light beam reflecting means and said photosensitive medium, means for swinging and tilting said light beam reflecting means and said projection optical system integrally, and means for varying the distance between said light beam reflecting means and said projection optical system in synchronism with the swinging and tilting action of said swinging and tilting means.

6. A scanning projection device comprising:
- a fixed first plane having a surface to be scanned;
- a second plane upon which the image of said first plane is projected;
- a deflector disposed between said first plane and said second plane to project the image of said first plane at a predetermined position on said second plane with lapse of time;
- a projection optical system disposed between said deflector and said second plane to place said first plane and said second plane in an optically conjugate positional relation;
- means for swinging and tilting said projection optical system in synchronism with the deflecting action of said deflector, wherein the center of swing and tilting of said projection optical system lies on the deflecting-reflecting surface of said deflector;
- means for varying the distance between said deflector and said projection optical system in synchronism with the deflecting action of said deflector;
- a magnification changing optical system retractably disposed on the light path between said projection optical system and said second plane; and
- light path length correcting means for rendering said first plane and said second plane optically conjugate when said magnification changing optical system is inserted into the light path.

* * * * *

UNITED STATES PATENT AND TRADEMARK OFFICE
CERTIFICATE OF CORRECTION

Page 1 of 2

PATENT NO. : 4,293,184
DATED : October 6, 1981
INVENTOR(S) : KAZUO MINOURA, ET AL.

It is certified that error appears in the above-identified patent and that said Letters Patent are hereby corrected as shown below:

Column 2

Line 33, change "maintained" to read --maintain--.

Column 4

Line 68, change "$\phi = \frac{1}{2} \{ \tan^{-1}(-\tan W_L/\beta) - W_L \} + \phi_0$" to read $-- \phi = \frac{1}{2} \{ \tan^{-1}(- \frac{\tan W_L}{\beta}) - W_L \} + \phi_0 --$.

Column 8

Line 22, after "configuration" insert --of--.

UNITED STATES PATENT AND TRADEMARK OFFICE
CERTIFICATE OF CORRECTION

PATENT NO. : 4,293,184
DATED : October 6, 1981
INVENTOR(S) : KAZUO MINOURA, ET AL.

It is certified that error appears in the above—identified patent and that said Letters Patent is hereby corrected as shown below:

Column 8

Line 61, change "-a/b" to read --- $\frac{b}{a}$ ---.

Signed and Sealed this

Eighth Day of June 1982

|SEAL|

Attest:

Attesting Officer

GERALD J. MOSSINGHOFF
Commissioner of Patents and Trademarks